US010433278B2

United States Patent
Xu et al.

(10) Patent No.: US 10,433,278 B2
(45) Date of Patent: Oct. 1, 2019

(54) METHODS AND DEVICE FOR ALLOCATING AND PROCESSING SUB-FRAME RESOURCE

(71) Applicant: ZTE Corporation, Shenzhen (CN)

(72) Inventors: Hui Xu, Shenzhen (CN); Zijiang Ma, Shenzhen (CN); Zhifeng Ma, Shenzhen (CN); Gaopeng Du, Shenzhen (CN); Yaying Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 121 days.

(21) Appl. No.: 15/503,615

(22) PCT Filed: Jan. 15, 2015

(86) PCT No.: PCT/CN2015/070801
§ 371 (c)(1),
(2) Date: Feb. 13, 2017

(87) PCT Pub. No.: WO2016/023338
PCT Pub. Date: Feb. 18, 2016

(65) Prior Publication Data
US 2017/0245242 A1 Aug. 24, 2017

(30) Foreign Application Priority Data
Aug. 14, 2014 (CN) .......................... 2014 1 0401503

(51) Int. Cl.
*H04W 72/12* (2009.01)
*H04W 72/00* (2009.01)
(Continued)

(52) U.S. Cl.
CPC ........... *H04W 72/005* (2013.01); *H04L 43/16* (2013.01); *H04W 68/005* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 8,660,049 B2 * | 2/2014 | Katayama ............. | H04L 5/0032 370/312 |
| 8,737,282 B2 * | 5/2014 | Tseng .................... | H04W 76/40 370/312 |

(Continued)

FOREIGN PATENT DOCUMENTS

| CN | 101909243 A | 12/2010 |
|---|---|---|
| CN | 101998241 A | 3/2011 |

(Continued)

OTHER PUBLICATIONS

Erik Dahlam, et al, "Multimedia Broadcast/Multicast Services" In "4G LTE/LTE Advanced for Mobile Broadband", Oct. 7, 2013, pp. 403-411, XP055367531.

(Continued)

*Primary Examiner* — Gregory B Sefcheck
(74) *Attorney, Agent, or Firm* — Cantor Colburn LLP

(57) ABSTRACT

Provided are methods and devices for allocating and processing sub-frame resources. In the methods, under the condition that a Multicast Channel (MCH) Scheduling Period (MSP) exceeds a Common Sub-frame allocation Period (CSP), an allocation manner for allocating Multicast Broadcast over Single Frequency Network (MBSFN) sub-frame resources to each MCH and a Multimedia Broadcast Multicast Service (MBMS) in the MCH is determined; and the allocation manner is notified to User Equipment (UE). According to the technical solutions provided above, under the condition that the MSP exceeds the CSP, MBMS resource scheduling may be implemented, the UE may be (Continued)

ensured to correctly receive a required MBMS, and user experiences may be improved.

10 Claims, 8 Drawing Sheets

(51) Int. Cl.
*H04L 12/26* (2006.01)
*H04W 68/00* (2009.01)

(56) References Cited

U.S. PATENT DOCUMENTS

| | | | | |
|---|---|---|---|---|
| 8,780,782 B2* | 7/2014 | Amerga | ................ | H04W 76/18 |
| | | | | 370/312 |
| 8,879,489 B2* | 11/2014 | Lee | ..................... | H04W 72/005 |
| | | | | 370/329 |
| 9,143,206 B2* | 9/2015 | Zhang | ................. | H04B 7/0874 |
| 9,173,226 B2* | 10/2015 | Van Lieshout | ..... | H04W 72/121 |
| 9,264,249 B2* | 2/2016 | Zhang | ................. | H04W 72/005 |
| 9,398,605 B2* | 7/2016 | Huang | ................... | H04W 4/06 |
| 9,426,743 B2* | 8/2016 | Lee | .................. | H04W 52/0229 |
| 9,532,185 B2* | 12/2016 | Amerga | .............. | H04W 72/005 |
| 10,111,157 B2* | 10/2018 | Kim | ........................ | H04W 4/06 |
| 10,117,226 B2* | 10/2018 | Huang | ................... | H04W 4/06 |
| 2010/0322135 A1* | 12/2010 | Van Lieshout | ..... | H04W 72/005 |
| | | | | 370/312 |
| 2011/0080859 A1* | 4/2011 | Phan | .................. | H04W 72/005 |
| | | | | 370/312 |

FOREIGN PATENT DOCUMENTS

| | | |
|---|---|---|
| CN | 101998246 A | 3/2011 |
| CN | 101998259 A | 3/2011 |
| CN | 103179577 A | 6/2013 |

OTHER PUBLICATIONS

European Search Report for corresponding application EP15832112: Report dated May 12, 2017.
ZTE, Dynamic schedule information transmission, 3GPP Draf, vol. RAN WG2, no. Miyazaki, Oct. 15, 2009, XP050604749.
International Search Report for corresponding application No. PCT/CN2015/070801 filed on Jan. 15, 2015; dated May 28, 2015.

* cited by examiner

| LCID1 | End MTCH1 = 3 |
| --- | --- |
| LCID2 | End MTCH2 = 6 |
| LCID3 | End MTCH3 = 9 |
| LCID1 | End MTCH1 = 2 |
| LCID2 | End MTCH2 = 7 |
| LCID3 | End MTCH3 = 9 |

Fig. 5a

| LCID1 | End MTCH1 = 6 |
| --- | --- |
| LCID2 | End MTCH2 = 14 |
| LCID3 | End MTCH3 = 19 |

Fig. 5b

| ... | ... |
|---|---|
| LCID2 | End MTCH2 = 2041 |
| LCID3 | End MTCH3 = 2042 |
| LCID3 | End MTCH3 = 8 |

Fig. 6a

| ... | ... |
|---|---|
| LCID2 | End MTCH2 = 2041 |
| LCID3 | End MTCH3 = 8 |

Fig. 6b

METHODS AND DEVICE FOR ALLOCATING AND PROCESSING SUB-FRAME RESOURCE

TECHNICAL FIELD

The present disclosure relates to the field of communication, and particularly to methods and devices for allocating and processing sub-frame resource.

BACKGROUND

Along with rapid development of the Internet and popularization of large-screen multifunctional mobile phones, a great deal of mobile data multimedia services and various high-bandwidth multimedia services emerge, such as the mobile data multimedia services of video conferencing, television broadcasting, video on demand, advertising, online education, interactive games and the like. Increasing service requirements of mobile users are met on one hand, and on the other hand, new service increasing points are also brought to mobile operating companies. These mobile data multimedia services require multiple users to simultaneously receive the same data, and compared with ordinary data services, have the characteristics of large data volume, long duration, time delay sensitivity and the like.

In order to effectively utilize mobile network resources, the 3rd Generation Partnership Project (3GPP) raises a Multimedia Broadcast Multicast Service (MBMS), and such a service is a technology of transmitting data from a data source to multiple targets, thereby implementing sharing of a network (including a core network and an access network) resource and increasing a utilization rate of the network resource (particularly an air interface resource). The MBMS defined by the 3GPP may not only implement pure-text and low-rate message multicast and broadcast but also implement high-speed multimedia service broadcast and multicast to provide various video, audio and multimedia services, which undoubtedly follows a tendency of future mobile data development and provides a broader service prospect for development of a 3rd-Generation (3G) mobile communication technology.

In Long Term Evolution (LTE), an MBMS may adopt a multicast mode, called a Multicast Broadcast over Single Frequency Network (MBSFN) sending mode, the MBMS service adopting the multicast mode may also be called an MBSFN service, and multiple cells may adopt the same modulation and coding scheme and send the same content by adopting the same physical resource. Multi-cell transmission of the MBMS has the following characteristics:

1) the MBMS is synchronously transmitted in an MBSFN area;

2) multi-cell MBMS transmission combination is supported;

3) a Multicast Traffic Channel (MTCH) and a Multicast Control Channel (MCCH) are mapped to a Multicast Channel (MCH) in a Point-to-Multipoint (p-T-m) mode; and 4) an MBSFN synchronization area, the MBSFN area, MBSFN transmission, advertisement and a preservation cell are all semi-statically configured by operation and maintenance. In such a manner, User Equipment (UE) of multiple cells may receive multiple pieces of MBMS data with the same content and perform SFN combination, thereby increasing a gain of a received signal. Multiple cells which send the same MBMS by adopting the same physical resource and an MBSFN sending mode form an MBSFN area.

During practical LTE networking, a plurality of MBSFN services exist in an MBSFN area, and all of these MBSFN services belonging to the same MBSFN area form an MBSFN service group. In other words, an MBSFN service group belongs to only one MBSFN area. An MBSFN area may include multiple cells, and an MBSFN service group which is completely the same is for each cell. Data channels MTCHs with multiple MBSFN services of the same MBSFN area and a control channel MCCH of the MBSFN services may be multiplexed to an MCH. An MCCH and multiple MTCHs of the same MBSFN area, i.e. multiple logical channels, may be mapped to the same transmission channel MCH; and the MCH is born through a Transport Block (TB) of an MBSFN sub-frame.

In a related technology, an MCH Sub-frame Allocation Pattern (MSAP) occasion is simultaneously introduced into the concept of MSAP, and it indicates all multicast resources included in an MCH corresponding a certain MSAP within a time period of a dynamic scheduling period. In an MSAP occasion, multiple MTCHs and dynamic scheduling information may be sent, and an MCCH may also be included. The dynamic scheduling information is born in a Media Access Control (MAC) Protocol Data Unit (PDU) Control Element (CE). A time length of an MSAP occasion is a scheduling period, and may also be called an MCH Scheduling Period (MSP), the MSP maximally being 10,240 ms. An MCH may allocate one or more MBSFN sub-frames in one or more MBSFN frames through an MSAP, wherein a sub-frame sent in a multicast mode is called an MBSFN sub-frame, and a frame including an MBSFN sub-frame is called an MBSFN frame. An MCH may include multiple MTCHs, that is, the multiple MTCHs are multiplexed to the same MCH.

On each MSAP occasion configured by an MCH, dynamic scheduling information is born, mapping information from MTCHs to auxiliary MSAP sub-frames is contained, and the mapping information is determined by virtue of an MBSFN sub-frame number index relationship in a scheduling period. UE may read the scheduling information to know allocation of each MTCH on the MBSFN sub-frames, and the UE may read an interested MTCH on the corresponding MBSFN sub-frame and neglect the MBSFN sub-frames not required to be read, so that MBMS receiving efficiency of the UE is improved, and power consumption of the UE is reduced. MBSFN sub-frame numbers mentioned here are determined as follows: all MBSFN sub-frames allocated by an MCH within a scheduling period are sequentially arranged and sequentially numbered.

In an existing LTE technology, multiple logical channels multiplex an MCH in a manner as follows: a sub-frame corresponds to a Transmission Time Interval (TTI), a TB may be sent in a TTI and each data TB corresponds to a MAC PDU. A MAC PDU may include multiple MAC Service Data Units (SDUs), and these MAC SDUs may be from different logical channels, the logical channels probably including an MTCH, an MCCH and the like. Data from different logical channels is sent together on a physical channel after being connected in series in the MAC PDUs.

In an LTE enhanced MBMS (eMBMS), a Common Sub-frame allocation Period (CSP) is adopted to allocate MCHs of MBSFN sub-frames in an MBSFN area in the MBSFN area, that is, the same CSP is adopted for multiple MCHs in an MBSFN and the same sub-frame allocation mode is adopted in each CSP. FIG. 1 is a schematic diagram of an MSP and a CSP according to the related technology. As shown in FIG. 1, MCH1, MCH2 and MCH3 exist in an MBSFN area; and MBSFN sub-frame resources are allocated to each MCH in a CSP, wherein the same sub-frame allocation mode is adopted in the CSP. An MSP may include multiple CSPs, and under a normal condition, a minimum MSP value is adopted for the CSPs. The MSP is for each MCH, that is, each MCH may have different MSPs, but multiple MCHs in an MBSFN area have the same CSP, a maximum value of the CSP is 2,560 ms and a maximum value of the MSP is 10,240 ms.

FIG. 2 is a schematic diagram of a dynamic MBMS MCH Scheduling Information (MSI) MAC CE according to the related technology. As shown in FIG. 2, a MAC PDU sub-header containing a Logical Channel Identifier (LCID) is adopted for identification. The MAC CE has a variable length, which is 2x bytes (x is a number of elements in an MBMS-SessionInfoList sequence). Each MTCH should include the following fields:

(1) LCID: this field is configured to indicate an LCID of the MTCH, and a length of the field is 5 bits; and (2) Stop MTCH: this field is configured to indicate a sequence number of a stop sub-frame of the corresponding MTCH in an MSAP occasion, a length of the field is 11 bits, a specific Stop MTCH value 2047 indicating that the corresponding MTCH is not scheduled and values in a range from 2043 to 2046 are reserved.

If a certain MTCH in an MAC PDU is not sent, 2047 may be adopted to identify this stop MTCH.

However, in the related technology, UE may not correctly receive a required MBMS under the condition that required sub-frame resources allocated to a certain MBMS in an MCH exceeds 2,043 sub-frames, and for this, there is yet no corresponding solution.

SUMMARY methods and devices for allocating and processing sub-frame resource are provided according to embodiments of the present disclosure, so as to at least solve the problem that UE may not learn about an allocation condition of MBSFN sub-frame resources for each MCH and an MBMS in the MCH so as not to acquire own required MBMS under the condition that an MSP exceeds a CSP in the related technology.

According to one aspect of the present disclosure, a method for allocating sub-frame resource is provided.

The method for allocating sub-frame resource according to the embodiment of the present disclosure may include that: under the condition that an MSP exceeds a CSP, an allocation manner for allocating MBSFN sub-frame resources to each MCH and an MBMS in the MCH is determined; and the allocation manner is notified to UE.

Preferably, the step that the allocation manner for allocating the MBSFN sub-frame resources to each MCH and the MBMS in the MCH is determined may include that: it is determined that the MSP includes multiple CSPs; the MBSFN sub-frame resources for the MBMSs are allocated to each MCH in each CSP; and the MBSFN sub-frames allocated to each MBMS in each CSP are indicated in MSI respectively.

Preferably, the step that the allocation manner for allocating the MBSFN sub-frame resources to each MCH and the MBMS in the MCH is determined may include that: the MBSFN sub-frame resources for the MBMSs are allocated to each MCH in the MSP; and under the condition that a number of MBSFN sub-frames allocated to a part of MCHs in the MSP is determined to exceed a preset threshold value, indication information is added to a corresponding position where the number of the MBSFN sub-frames allocated to the part of MCHs reaches the preset threshold value, and recounting of other MBSFN sub-frames after the position is started, wherein a number of the other MBSFN sub-frames may be a difference value between a number of all MBSFN sub-frames included in the MBSFN sub-frame resources and the preset threshold value, and if the number of the other MBSFN sub-frames still exceeds the preset threshold value, indication information may be added to corresponding positions where the preset threshold value is reached every time and the other MBSFN sub-frames after the positions may be recounted until the number of the other MBSFN sub-frames is lower than the preset threshold value.

Preferably, the step that the allocation manner for allocating the MBSFN sub-frame resources to each MCH and the MBMS in the MCH is determined may include that: the MBSFN sub-frame resources for the MBMSs are allocated to each MCH in the MSP; and under the condition that a number of MBSFN sub-frames allocated to a part of MCHs in the MSP is determined to exceed a preset threshold value, recounting of other MBSFN sub-frames after a corresponding position where the number of the MBSFN sub-frames allocated to the part of MCHs reaches the preset threshold value is started according to an agreement premade with the UE, wherein a number of the other MBSFN sub-frames may be a difference value between a number of all MBSFN sub-frames included in the MBSFN sub-frame resources and the preset threshold value, and if the number of the other MBSFN sub-frames still exceeds the preset threshold value, the other MBSFN sub-frames after corresponding positions where the preset threshold value is reached every time may be recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time may be recounted.

Preferably, the step that the allocation manner for allocating the MBSFN sub-frame resources to each MCH and the MBMS in the MCH is determined may include that: a limiting condition is configured, wherein the limiting condition may be that a number of MBSFN sub-frames allocated to each MCH for the MBMSs in the MSP does not exceed a preset threshold value; and the MBSFN sub-frame resources for the MBMSs are allocated to each MCH in the MSP according to the limiting condition.

Preferably, the step that the allocation manner for allocating the MBSFN sub-frame resources to each MCH and the MBMS in the MCH is determined may include that: a length of a stop MTCH field in the MSI is regulated, wherein the length of the stop MTCH field may be increased by N bits, wherein N may be a positive integer.

Preferably, the preset threshold value may be 2,043 MBSFN sub-frames.

According to another aspect of the present disclosure, a method for processing sub-frame resource is provided.

The method for processing sub-frame resource according to the embodiment of the present disclosure may include that: an allocation manner notice is received from network-side equipment, wherein the allocation manner notice may be configured to indicate that the network-side equipment determines an allocation manner for allocating MBSFN sub-frame resources to each MCH and an MBMS in the MCH under the condition that an MSP exceeds a CSP; and a required MBMS is acquired according to the allocation manner notice.

According to another aspect of the present disclosure, a device for allocating sub-frame resource is provided.

The device for allocating sub-frame resource according to the embodiment of the present disclosure may include: a determination module, configured to, under the condition that an MSP exceeds a CSP, determine an allocation manner for allocating MBSFN sub-frame resources to each MCH and an MBMS in the MCH; and a notification module, configured to notify the allocation manner to UE.

Preferably, the determination module may include: a determination unit, configured to determine that the MSP includes multiple CSPs; a first allocation unit, configured to allocate the MBSFN sub-frame resources for the MBMSs to each MCH in each CSP; and an indication unit, configured to indicate the MBSFN sub-frames allocated to each MBMS in each CSP in MSI respectively.

Preferably, the determination module may include: a second allocation unit, configured to allocate the MBSFN sub-frame resources for the MBMSs to each MCH in the MSP; and a first processing unit, configured to, and under the condition that a number of MBSFN sub-frames allocated to a part of MCHs in the MSP is determined to exceed a preset threshold value, add indication information to a corresponding position where the number of the MBSFN sub-frames allocated to the part of MCHs reaches the preset threshold value, and start recounting of other MBSFN sub-frames after the position, wherein a number of the other MBSFN sub-frames may be a difference value between a number of all MBSFN sub-frames included in the MBSFN sub-frame resources and the preset threshold value, and if the number of the other MBSFN sub-frames still exceeds the preset threshold value, indication information may be added to corresponding positions where the preset threshold value is reached every time and the other MBSFN sub-frames after the positions may be recounted until the number of the other MBSFN sub-frames is lower than the preset threshold value.

Preferably, the determination module may include: a third allocation unit, configured to allocate the MBSFN sub-frame resources for the MBMSs to each MCH in the MSP; and a second processing unit, configured to, and under the condition that a number of MBSFN sub-frames allocated to a part of MCHs in the MSP is determined to exceed a preset threshold value, start recounting of other MBSFN sub-frames after a corresponding position where the number of the MBSFN sub-frames allocated to the part of MCHs reaches the preset threshold value according to an agreement premade with the UE, wherein a number of the other MBSFN sub-frames may be a difference value between a number of all MBSFN sub-frames included in the MBSFN sub-frame resources and the preset threshold value, and if the number of the other MBSFN sub-frames still exceeds the preset threshold value, the other MBSFN sub-frames after corresponding positions where the preset threshold value is reached every time may be recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time may be recounted.

Preferably, the determination module may include: a configuration unit, configured to configure a limiting condition, wherein the limiting condition may be that a number of MBSFN sub-frames allocated to each MCH for the MBMSs in the MSP does not exceed a preset threshold value; and a fourth allocation unit, configured to allocate the MBSFN sub-frame resources for the MBMSs to each MCH in the MSP according to the limiting condition.

Preferably, the determination module may include: a regulation unit, configured to regulate a length of a stop MTCH field in the MSI, wherein the length of the stop MTCH field may be increased by N bits, wherein N may be a positive integer.

Preferably, the preset threshold value may be 2,043 MBSFN sub-frames.

According to another aspect of the present disclosure, a device for processing sub-frame resource is provided.

The device for processing sub-frame resource according to the embodiment of the present disclosure may include: a receiving module, configured to receive an allocation manner notice from network-side equipment, wherein the allocation manner notice may be configured to indicate that the network-side equipment determines an allocation manner for allocating MBSFN sub-frame resources to each MCH and an MBMS in the MCH under the condition that an MSP exceeds a CSP; and an acquisition module, configured to acquire a required MBMS according to the allocation manner notice.

According to the embodiment of the present disclosure, the allocation manner for allocating the MBSFN sub-frame resources to each MCH and the MBMS in the MCH is determined under the condition that the MSP exceeds the CSP, and the allocation manner is notified to the UE, so that the problem that the UE may not learn about an allocation condition of the MBSFN sub-frame resources for each MCH and the MBMS in the MCH so as not to acquire own required MBMS under the condition that the MSP exceeds the CSP in the related technology is solved, MBMS resource scheduling when the MSP exceeds the CSP may further be implemented, the UE may be ensured to correctly receive the required MBMS, and user experiences may be improved.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings:

FIG. 5a is a schematic diagram of indicating sub-frame resources allocated in each CSP in distributed scheduling according to a preferred embodiment of the present disclosure;

FIG. 5b is a schematic diagram of indicating sub-frame resources allocated in each CSP in continuous scheduling according to a preferred embodiment of the present disclosure;

FIG. 6a is a schematic diagram of an MSI indication manner according to preferred embodiment 1 of the present disclosure;

FIG. 6b is a schematic diagram of an MSI indication manner according to preferred embodiment 2 of the present disclosure;

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
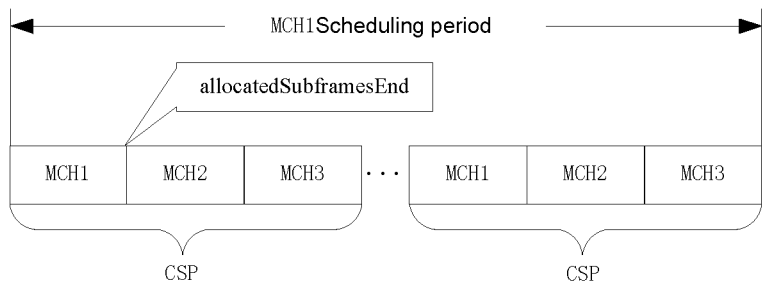
FIG. 1 is a schematic diagram of an MSP and a CSP according to the related technology.
Figure 2:
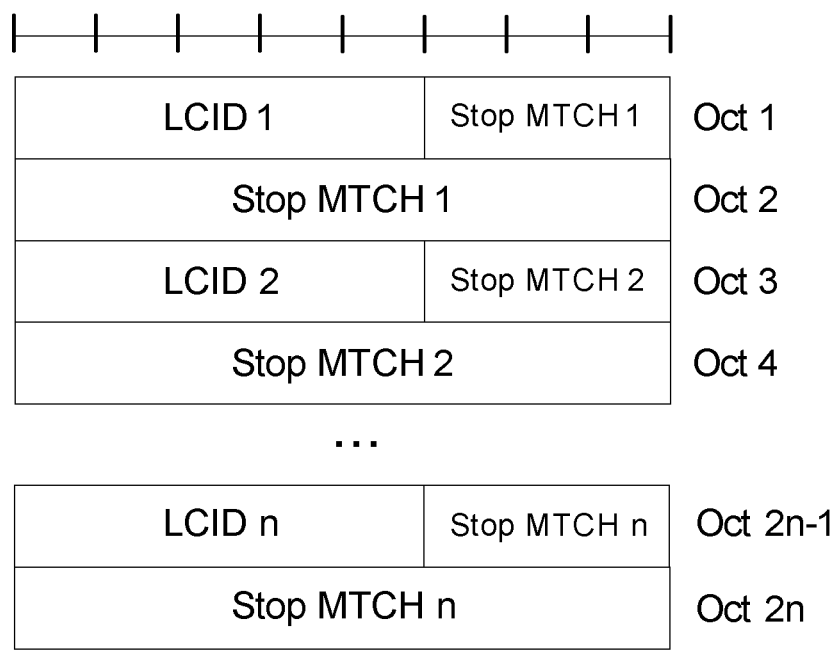
FIG. 2 is a schematic diagram of a dynamic MBMS MSI MAC CE according to the related technology.
Figure 3:
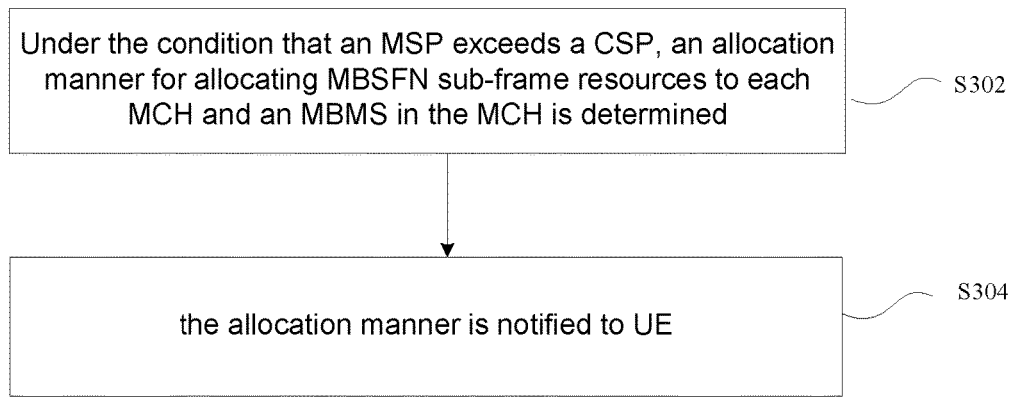
FIG. 3 is a flowchart of a method for allocating sub-frame resource according to an embodiment of the present disclosure.

FIG. 3 is a flowchart of a method for allocating sub-frame resource according to an embodiment of the present disclosure. As shown in FIG. 3, the method may include the following steps:

Step S302: under the condition that an MSP exceeds a CSP, an allocation manner for allocating MBSFN sub-frame resources to each MCH and an MBMS in the MCH is determined; and Step S304: the allocation manner is notified to UE.

In the related technology, the UE may not learn about an allocation condition of the MBSFN sub-frame resources for each MCH and the MBMS in the MCH so as not to acquire own required MBMS under the condition that the MSP exceeds the CSP. According to the method shown in FIG. 3, under the condition that the MSP exceeds the CSP, network-side equipment may determine the allocation manner for allocating the MBSFN sub-frame resources to each MCH and the MBMS in the MCH at first, and then notifies the allocation manner to the UE to enable the UE to determine the required MBMS service according to the acquired allocation manner. Therefore, the problem that the UE may not learn about the allocation condition of the MBSFN sub-frame resources for each MCH and the MBMS in the MCH so as not to acquire own required MBMS under the condition that the MSP exceeds the CSP in the related technology is solved, MBMS resource scheduling when the MSP exceeds the CSP may further be implemented, the UE may be ensured to correctly receive the required MBMS, and user experiences may be improved.

Note that the MBMS mentioned in the following preferred embodiments of the present disclosure refers to an enhanced MBMS, i.e. an eMBMS. In the embodiment of the present disclosure, the concepts of MCH and Physical Multicast Channel (PMCH) are not strictly distinguished, that is, a sub-frame resource allocated to an MCH in the embodiment of the present disclosure may also be considered as a sub-frame resource allocated to a PMCH, wherein the MCH belongs to a transmission layer channel, and the PMCH belongs to a physical layer channel.

Preferably, in Step 302, the operation that the allocation manner for allocating the MBSFN sub-frame resources to each MCH and the MBMS in the MCH is determined may include the following operations:

Step S1: it is determined that the MSP includes multiple CSPs, and the MBSFN sub-frame resources for the MBMSs are allocated to each MCH in each CSP; and Step S2: the MBSFN sub-frames allocated to each MBMS in each CSP are indicated in MSI respectively.

In a preferred embodiment, when the MSP exceeds the CSP, an eNB may allocate the resources to the MBMSs in each CSP, and indicate resource allocation in each CSP in the MSI.

The eNB may judge whether the MSP exceeds the CSP or not according to an MSP value and CSP value in an MCCH related message received from a Multi-cell/multicast Coordination Entity (MCE). If the MSP is more than or equal to the CSP, a minimum MSP value is adopted for the CSP, wherein a maximum value of the CSP is 2,560 ms, and a maximum value of the MSP is 10,240 ms.

The eNB may select a sub-frame allocation manner according to Quality of Service (QoS) attributes of the MBMSs, MBSFN sub-frame resources, a strategy of an operating company and the like, and the sub-frame allocation manner is implemented by a scheduling algorithm of the eNB under a normal condition.

Figure 4A:
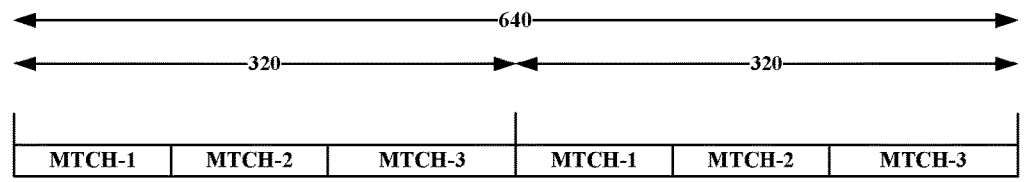
FIG. 4a is a schematic diagram of distributed resource scheduling according to a preferred embodiment of the present disclosure.

If the MSP exceeds the CSP, for example: MSP=640 ms and CSP=320 ms, that is, there are two CSPs in an MSP, the eNB may adopt a distributed manner when allocating the sub-frame resources to the MBMSs, that is, the eNB allocates certain sub-frame resources to each MTCH in the MCHs in each CSP of the CSPs. FIG. 4a is a schematic diagram of distributed resource scheduling according to a preferred embodiment of the present disclosure. As shown in FIG. 4a, CSP=320 ms, MCH1 includes only three MBMSs, i.e. MTCH1, MTCH2 and MTCH3 respectively, and an MSP of MCH1 is 640 ms.

The eNB allocates the resources to the MBMSs in each CSP, and adds an indication in MSI. The eNB may allocate the resources to each MBMS according to acquired numbers of MBSFN sub-frames allocated to each MCH in the CSPs and a distributed scheduling algorithm, each MBMS (MTCH) in the MCHs may acquire certain sub-frame resources in each CSP, and the eNB indicates the sub-frame resources allocated in each CSP in the MSI. Considering that the MSP exceeds the CSP, for example: MSP=320 ms and CSP=160 ms, that is, there are two CSPs in an MSP, sub-frame allocation in each CSP is indicated in the MSI. For example: an MSP of MCH1 is 320 ms, there are three MBMSs MTCH1, MTCH2 and MTCH3 in MCH1, 10 MBSFN sub-frames are allocated to MCH1 in each CSP, and then numbers of sub-frames which may be allocated by the eNB in the first CSP in the MSP are as follows: MTCH1=4, MTCH2=3 and MTCH3=3; the numbers of sub-frames allocated in the second CSP are as follows: MTCH1=5, MTCH2=5 and MTCH3=2. FIG. 5a is a schematic diagram of indicating sub-frame resources allocated in each CSP in distributed scheduling according to a preferred embodiment of the present disclosure. The eNB indicates the sub-frame resources specifically allocated in each CSP in the MSI, as shown in FIG. 5a.

Preferably, in Step 302, the operation that the allocation manner for allocating the MBSFN sub-frame resources to each MCH and the MBMS in the MCH is determined may include the following steps:

Step S3: the MBSFN sub-frame resources for the MBMSs are allocated to each MCH in the MSP; and Step S4: under the condition that a number of MBSFN sub-frames allocated to a part of MCHs in the MSP is determined to exceed a preset threshold value, indication information is added to a corresponding position where the number of the MBSFN sub-frames allocated to the part of MCHs reaches the preset threshold value, and recounting of other MBSFN sub-frames after the position is started, wherein a number of the other MBSFN sub-frames is a difference value between a number of all MBSFN sub-frames included in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value.

In a preferred implementation process, the preset threshold value is 2,043 MBSFN sub-frames.

In a preferred embodiment, when the MSP exceeds the CSP, the eNB may allocate the resources to the MBMSs in the MSP, and if more than 2,043 MBSFN sub-frame resources for the MBMSs are allocated to an MCH in the MSP, the UE is notified through the indication information in the MSI.

Figure 4B:
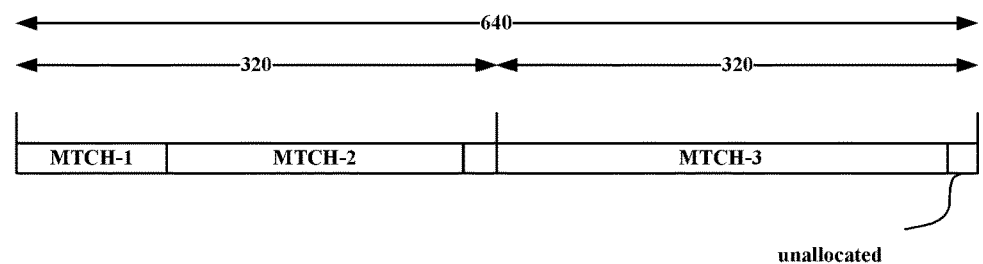
FIG. 4b is a schematic diagram of continuous resource scheduling according to a preferred embodiment of the present disclosure.

If the MSP exceeds the CSP, for example: MSP=640 ms and CSP=320 ms, that is, there are two CSPs in an MSP, the eNB may adopt a continuous manner when allocating the sub-frame resources to the MBMSs, that is, the eNB allocates continuous sub-frame resources to each MTCH service in the MCHs in the CSPs. That is, the continuous manner refers to allocating required sub-frame resources to a certain MBMS 1 in an MCH in a CSP, then allocating required sub-frame resources to an MBMS 2 and then allocating required sub-frame resources to an MBMS 3, . . . , until all the MBMSs in the MCH acquire required resources. FIG. 4b is a schematic diagram of continuous resource scheduling according to a preferred embodiment of the present disclosure. As shown in FIG. 4b, CSP=320 ms, MCH1 includes only three MBMSs, i.e. MTCH1, MTCH2 and MTCH3 respectively, and an MSP of MCH1 is 640 ms.

The eNB allocates the resources to the MBMSs in the MSP. The eNB may allocate the resources to each MBMS according to acquired numbers of MBSFN sub-frames allocated to each MCH in the CSPs and a continuous scheduling algorithm, each MBMS (MTCH) in the MCHs may sequentially acquire certain sub-frame resources in an MSP, and the eNB indicates the sub-frame resources allocated in each MSP in the MSI. Considering that the MSP exceeds the CSP, for example: MSP=320 ms and CSP=160 ms, that is, there are two CSPs in an MSP, sub-frame allocation in each CSP is indicated in the MSI. For example: an MSP of MCH1 is 320 ms, there are three MBMSs MTCH1, MTCH2 and MTCH3 in MCH1, 10 MBSFN sub-frames are allocated to MCH1 in each CSP, and then numbers of sub-frames which may be allocated by the eNB in the MSP are as follows: MTCH1=7, MTCH2=8 and MTCH3=5. FIG. 5b is a schematic diagram of indicating sub-frame resources allocated in each CSP in continuous scheduling according to a preferred embodiment of the present disclosure. The eNB indicates the sub-frame resources specifically allocated in each CSP in the MSI, as shown in FIG. 5b.

Preferably, in Step S302, the operation that the allocation manner for allocating the MBSFN sub-frame resources to each MCH and the MBMS in the MCH is determined may include the following operations:

Step S5: the MBSFN sub-frame resources for the MBMSs are allocated to each MCH in the MSP; and Step S6: under the condition that a number of MBSFN sub-frames allocated to a part of MCHs in the MSP is determined to exceed a preset threshold value, recounting of other MBSFN sub-frames after a corresponding position where the number of the MBSFN sub-frames allocated to the part of MCHs reaches the preset threshold value is started according to an agreement premade with the UE, wherein a number of the other MBSFN sub-frames is a difference value between a number of all MBSFN sub-frames included in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

In a preferred embodiment, the eNB may indicate and allocate more than 2,043 sub-frames in the MSI by the following two methods.

1) A position of the 2,043rd sub-frame is indicated at first, and then other sub-frames are continued to be recounted from 0.

2) 2,043 is not indicated, and if 2,043 is exceeded, the other sub-frames are continued to be recounted from 0, for example: MSP=2*CSP.

MCH1 includes MTCH1, MTCH2 and MTCH3, wherein the last sub-frame allocated to MTCH2 is 2041, and 10 sub-frames are allocated to MTCH3. FIG. 6a is a schematic diagram of an MSI indication manner according to preferred embodiment 1 of the present disclosure. FIG. 6b is a schematic diagram of an MSI indication manner according to preferred embodiment 2 of the present disclosure. As shown in FIG. 6a and FIG. 6b, the UE may judge that MTCH3 occupies 10 sub-frames and positions of the sub-frames include a sub-frame numbered as 2,042 and sub-frames numbered as 0-8 according to information in the MSI.

Note that the sub-frames numbered as 0-8 are sub-frames after the sub-frame numbered as 2,042, that is, MBSFN sub-frames are continued to be numbered from 0 after the number 2,042 in an MSP.

In addition, it is important to note that: it is required in FIG. 6b that a number of sub-frames allocated to a single MTCH does not exceed 2,043. If more than 2,043 sub-frames are allocated to a single MTCH, the method shown in FIG. 6a is required to be adopted. In order to reduce influence on the other MBMSs, the MTCH may be arranged at the end of the MSI for indication.

Preferably, in Step S302, the operation that the allocation manner for allocating the MBSFN sub-frame resources to each MCH and the MBMS in the MCH is determined may include the following steps:

Step S7: a limiting condition is configured, wherein the limiting condition is that a number of MBSFN sub-frames allocated to each MCH for the MBMSs in the MSP does not exceed a preset threshold value; and Step S8: the MBSFN sub-frame resources for the MBMSs are allocated to each MCH in the MSP according to the limiting condition.

In a preferred embodiment, when the MSP exceeds the CSP, the MCE may pre-limit that the number of the MBSFN sub-frames allocated to each MCH for the MBMSs in each MSP does not exceed 2,043, that is, numbers of sub-frames which may be allocated to any MCH in each MSP may not exceed 2,042.

In addition, the MBSFN sub-frames allocated to each MCH for the MBMSs may also be limited to another specific value, for example: 1,536. The numbers of the MBSFN sub-frames allocated to each MCH are sent to the eNB through M2 interface signalling by the MCE, and limiting the numbers of the MBSFN sub-frames is limiting the numbers of the allocated MBSFN sub-frames by the MCE.

Preferably, in Step S302, the operation that the allocation manner for allocating the MBSFN sub-frame resources to each MCH and the MBMS in the MCH is determined may include the following operation:

Step S9: a length of a stop MTCH field in the MSI is regulated, wherein the length of the stop MTCH field is increased by N bits, wherein N is a positive integer.

In the preferred embodiment, the eNB is required to distinguish the abovementioned two manners (distributed or continuous) in the MSI, otherwise the UE may not judge the positions of the resources. Meanwhile, stop MTCH in the MSI is 11 bits, and except a reserved number, a maximum sub-frame number is 2,043. The eNB may calculate the numbers of the MBSFN sub-frames allocated to each MCH in an MSP. Since the MSP exceeds the CSP, for example: CSP=2,560 ms and MSP=5,120 ms, maximally 256*6=1,536 MBSFN sub-frames are allocated in each CSP and one MSP is equal to 2 CSPs, 1,536*23,072 MBSFN sub-frames may be allocated in each MSP, and obviously exceed 2,043, so that 11 bits are insufficient for representation, that is, stop MTCH in the MSI may not indicate the sub-frames after 2,043. In order to implement further expansion, a bit number of the stop MTCH may also be increased to 13, then a maximum value may be represented to be 8,192, and the positions of the MBSFN sub-frames in the whole MSP may further be represented.

Figure 7:
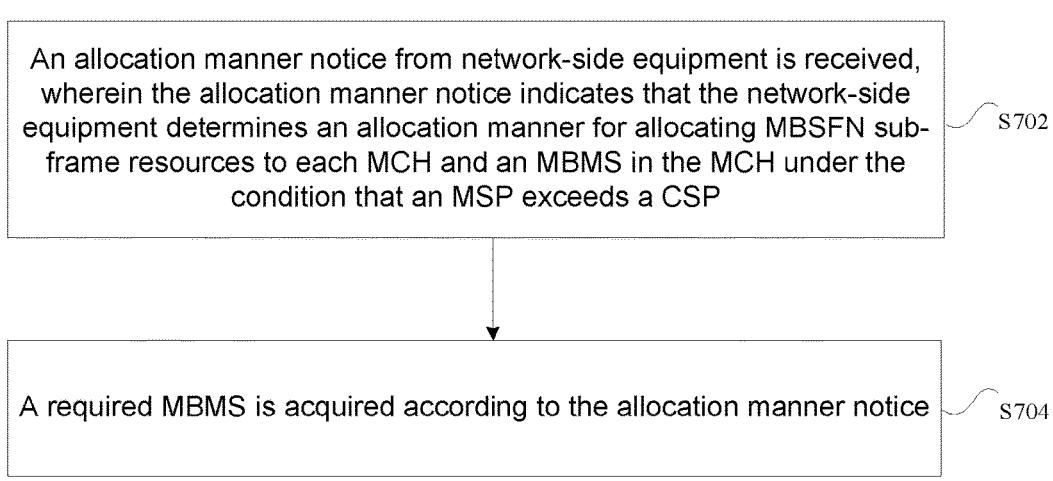
FIG. 7 is a flowchart of a method for processing sub-frame resource according to an embodiment of the present disclosure.

FIG. 7 is a flowchart of a method for processing sub-frame resource according to an embodiment of the present disclosure. As shown in FIG. 7, the method may include the following processing steps:

Step S702: an allocation manner notice is received from network-side equipment, wherein the allocation manner notice is configured to indicate that the network-side equipment determines an allocation manner for allocating MBSFN sub-frame resources to each MCH and an MBMS in the MCH under the condition that an MSP exceeds a CSP; and Step S704: a required MBMS is acquired according to the allocation manner notice.

In a preferred embodiment, an eNB allocates continuous sub-frame resources to each MTCH, and sends MSI. Since the MBSFN sub-frame resources do not exceed 2,043, positions of the sub-frames may be indicated in the MSI without any additional processing.

UE interested in receiving MTCH1, MTCH2 or MTCH3 may determine a relationship between the MSP and the CSP and numbers of sub-frames which may be allocated in each CSP and MSP according to MCCH information. If the MSP exceeds the CSP, the UE may determine that the sub-frames acquired by MTCH2 are located in two CSPs respectively, that is, there are three sub-frames in the first CSP, there are five sub-frames in the second CSP, the positions of the sub-frames in the first CSP are after MTCH1 in MCH1, and the positions of the sub-frames in the second CSP are starting positions in MCH1, and the positions of the sub-frames of MTCH3 are located after MTCH2 in MCH1 in the second CSP.

The abovementioned preferred implementation process will be further described below with reference to preferred embodiment 1 to preferred embodiment 3.

Preferred Embodiment 1

Figure 8:
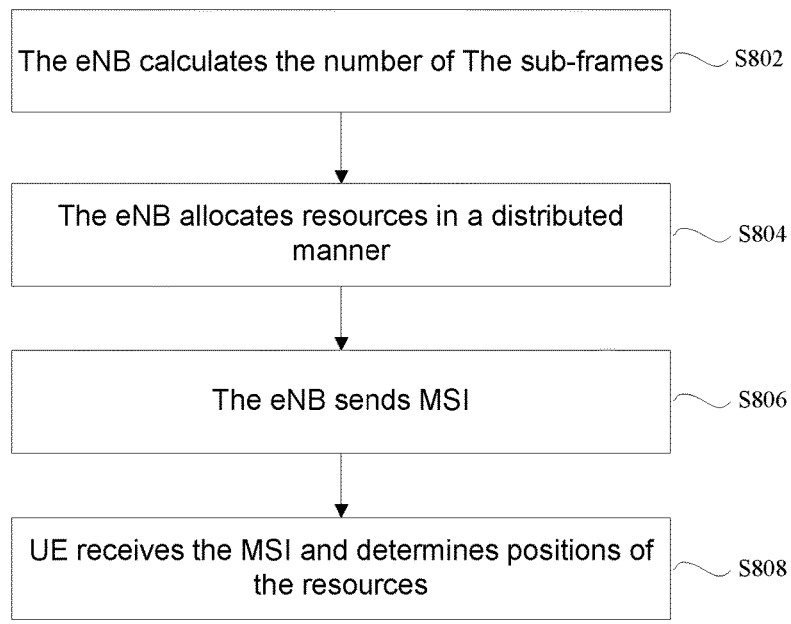
FIG. 8 is a flowchart of a method for implementing MBMS scheduling in a scenario where an Evolved Node B (eNB) allocates MBSFN sub-frames in a distributed manner according to a preferred embodiment of the present disclosure.

FIG. 8 is a flowchart of a method for implementing MBMS scheduling in a scenario where an eNB allocates MBSFN sub-frames in a distributed manner according to a preferred embodiment of the present disclosure. As shown in FIG. 8, the flow may include the following processing steps:

Step S802: an eNB calculates a number of MBSFN sub-frames which may be allocated in an MSP.

The eNB calculates the number of the MBSFN sub-frames which may be allocated according to PMCH sub-frame allocation information in MCCH related information received from an MCE and a relationship between the MSP and a CSP. For example: MSP=320 ms, CSP=160 ms and sf-AllocEnd=100, it may be determined that the number of the MBSFN sub-frames in the MSP is 100*(320/160)=200.

Step S804: the eNB allocates sub-frame resources to MBMSs in MCHs in a distributed manner.

In the MSP of each MCH, the eNB allocates the MBSFN sub-frame resources allocated to the MCH to different MBMSs, wherein allocation is performed in the CSP according to the distributed manner, that is, each MBMS (MTCH) in the MCH acquires a certain number of sub-frame resources; and if the MSP exceeds the CSP, numbers of sub-frames allocated to the MBMSs in different CSPs may be different.

Step S806: the eNB sends MSI according to a sub-frame allocation result.

The eNB indicates the sub-frame allocation result, i.e. the numbers of the MBSFN sub-frames allocated to different MTCHs, in the MSI. The eNB sends the MSI through an MAC CE.

Step S808: UE receives the MSI from the eNB, and acquires positions of the sub-frames of an MBMS in which the UE is interested.

The UE is UE interested in receiving the MBMS, and the UE reads the MSI in the MAC CE, determines the interested MBMS according to an LCID in the MSI, and then acquires position information of the sub-frames of the MBMS in which the UE is interested according to End MTCH information.

Preferred Embodiment 2

Figure 9:
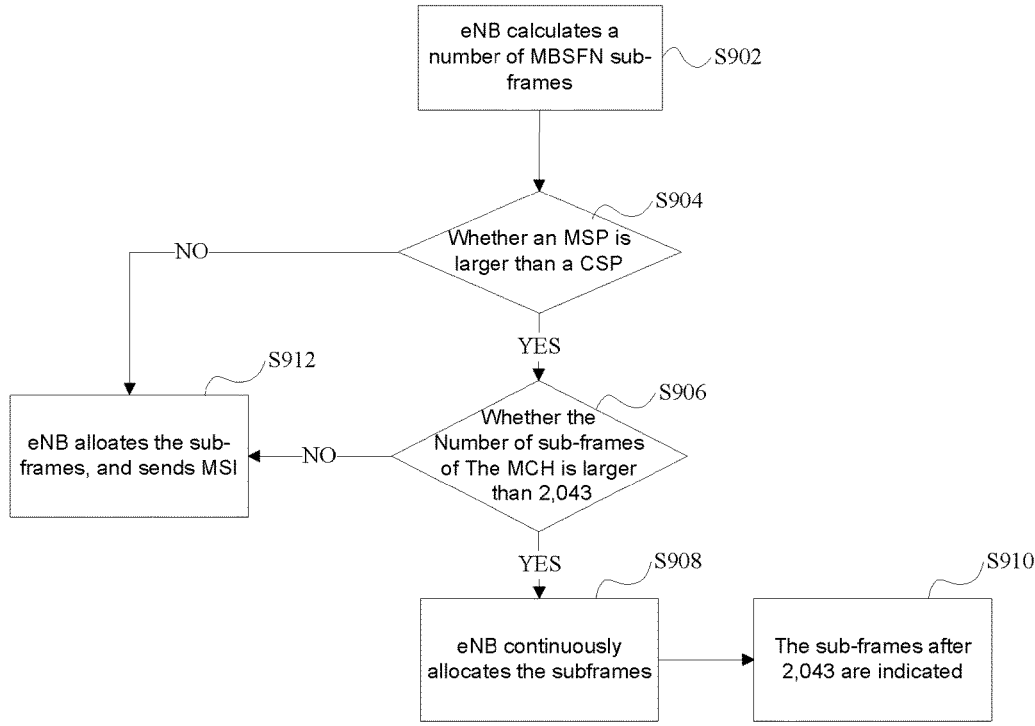
FIG. 9 is a flowchart of a method for implementing MBMS scheduling in a scenario where an eNB continuously allocates MBSFN sub-frames according to a preferred embodiment of the present disclosure.

FIG. 9 is a flowchart of a method for implementing MBMS scheduling in a scenario where an eNB continuously allocates MBSFN sub-frames according to a preferred embodiment of the present disclosure. As shown in FIG. 9, the flow may include the following processing steps:

Step S902: an eNB calculates a number of MBSFN sub-frames which may be allocated in an MSP.

The eNB calculates the number of the MBSFN sub-frames which may be allocated according to PMCH sub-frame allocation information in MCCH related information received from an MCE and a relationship between the MSP and a CSP.

Step S904: the eNB judges whether the MSP exceeds a CSP or not, continues executing Step S906 if YES, otherwise turns to Step S912.

The eNB may judge whether the MSP exceeds the CSP or not according to numerical values of the MSP and the CSP in the MCCH related information received from the MCE.

Step S906: the eNB calculates whether the number of the MBSFN sub-frames exceeds 2,043 or not, continues executing Step S908 if YES, otherwise turns to Step S912.

The eNB calculates whether numbers of MBSFN sub-frames allocated to each MCH for MBMSs in an MSP exceed 2,043 or not.

Step S908: the eNB allocates continuous MBSFN sub-frames to each MBMS in the MCHs.

Step S910: the eNB indicates information about that there are more than 2,043 sub-frames in the MSI, and the flow is ended.

Step S912: the eNB allocates the sub-frames, and sends MSI, and the flow is ended. The eNB allocates the continuous sub-frame resources to each MTCH and sends the MSI. Since there are less than 2,043 MBSFN sub-frame resources, positions of the sub-frames may be indicated in the MSI without any additional processing.

Preferred Embodiment 3

Figure 10:
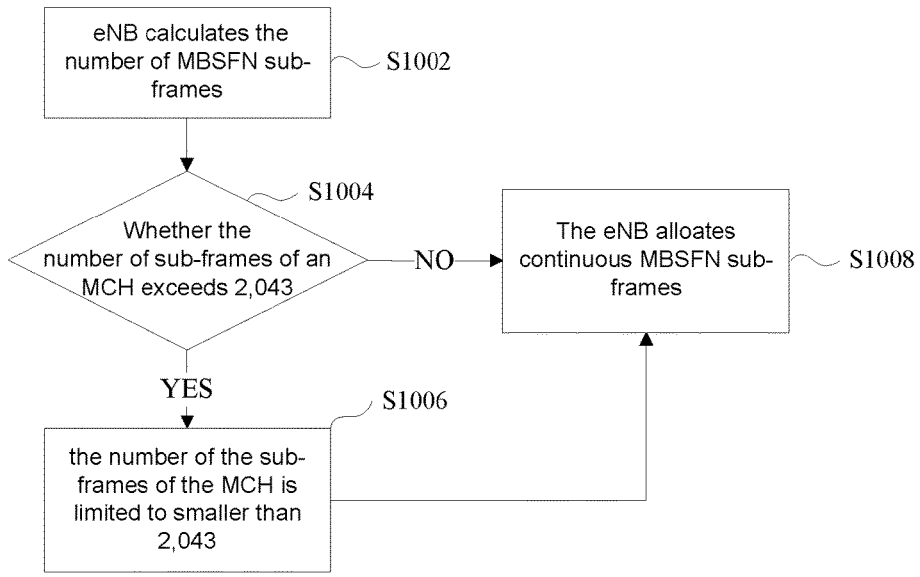
FIG. 10 is a flowchart of a method for implementing MBMS scheduling in a scenario where an eNB continuously allocates MBSFN sub-frames and it is limited that a number of the MBSFN sub-frames allocated to each MCH does not exceed 2,043 according to a preferred embodiment of the present disclosure.

FIG. 10 is a flowchart of a method for implementing MBMS scheduling in a scenario where an eNB continuously allocates MBSFN sub-frames and it is limited that a number of the MBSFN sub-frames allocated to each MCH does not exceed 2,043 according to a preferred embodiment of the present disclosure. As shown in FIG. 10, the method may include the following processing steps.

Step S1002: an eNB calculates a number of MBSFN sub-frames to each MCH in an MSP.

Step S1004: whether the number of the MBSFN sub-frames exceeds 2,043 or not is judged, Step S1006 is continued to be executed if YES, otherwise Step S1008 is executed.

Step S1006: it is limited that the number of the MBSFN sub-frames available to MBMSs does not exceed 2,043.

In a preferred embodiment, it may be selected that a number of MBSFN sub-frames allocated to each MCH for MBMSs in an MSP does not exceed 2,043. If an MSP includes multiple CSPs, it is necessary to averagely allocate required MBSFN sub-frames in the multiple CSPs, and their total number does not exceed 2,043. For example: MSP=10,240 ms and CSP=2,560 ms, that is, MSP=4*CSP, and the number of the MBSFN sub-frames allocated to each MCH in each CSP does not exceed 510 (2,043/4). Or if more than 2,043 MBSFN sub-frames are allocated to an MCH in an MSP, when the eNB allocates the sub-frames to the MBMSs in the MCH, the number of the sub-frames allocated to all the MBMSs does not exceed 2,043. When the number of the sub-frames of each MCH does not exceed 2,043, Step S1008 is continued.

It is important to note that the number of the MBSFN sub-frames allocated to each MCH is sent to the eNB by an MCE through M2 interface signalling, and limiting the number of the MBSFN sub-frames is limiting the number of the allocated MBSFN sub-frames.

Step S1008: the eNB allocates continuous sub-frames to the MBMSs and sends MSI.

Figure 11:
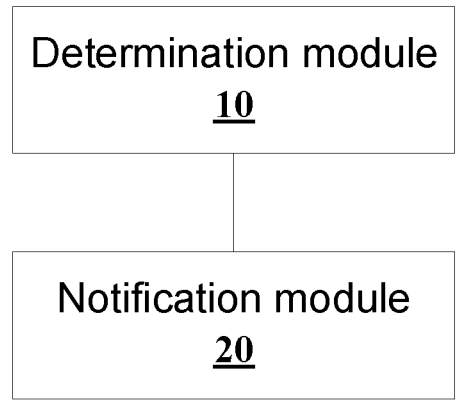
FIG. 11 is a structure block diagram of a device for allocating sub-frame resource according to an embodiment of the present disclosure.

FIG. 11 is a structure block diagram of a device for allocating sub-frame resource according to an embodiment of the present disclosure. As shown in FIG. 11, the device for allocating sub-frame resource may include: a determination module 10, configured to, under the condition that an MSP exceeds a CSP, determine an allocation manner for allocating MBSFN sub-frame resources to each MCH and an MBMS in the MCH; and a notification module 20, configured to notify the allocation manner to UE.

Figure 12:
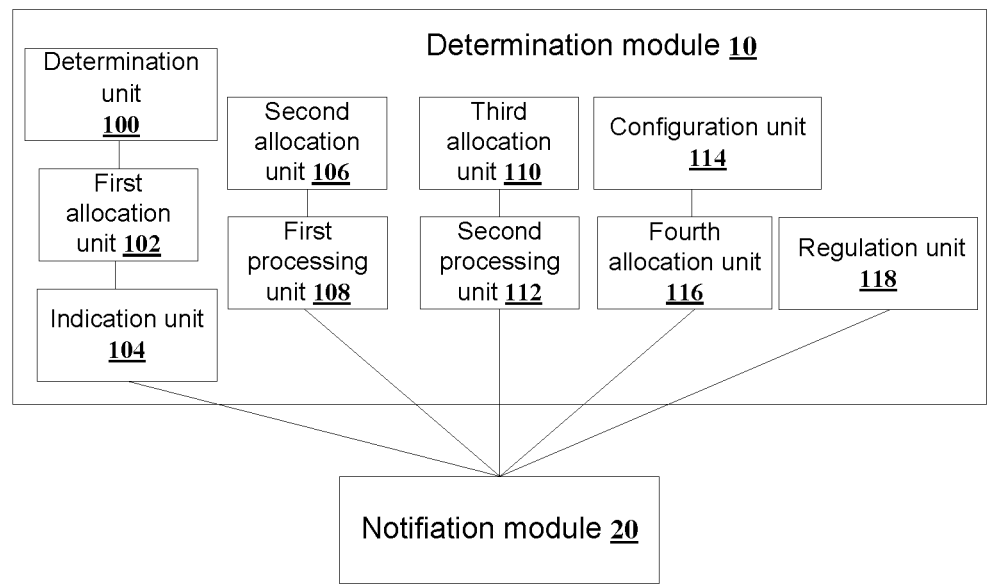
FIG. 12 is a structure block diagram of a device for allocating sub-frame resource according to a preferred embodiment of the present disclosure.

Preferably, as shown in FIG. 12, the determination module 10 may include: a determination unit 100, configured to determine that the MSP includes multiple CSPs; a first allocation unit 102, configured to allocate the MBSFN sub-frame resources for the MBMSs to each MCH in each CSP; and an indication unit 104, configured to indicate the MBSFN sub-frames allocated to each MBMS in each CSP in MSI respectively.

Preferably, as shown in FIG. 12, the determination module 10 may include: a second allocation unit 106, configured to allocate the MBSFN sub-frame resources for the MBMSs to each MCH in the MSP; and a first processing unit 108, configured to, and under the condition that a number of MBSFN sub-frames allocated to a part of MCHs in the MSP is determined to exceed a preset threshold value, add indication information to a corresponding position where the number of the MBSFN sub-frames allocated to the part of MCHs reaches the preset threshold value, and start recounting of other MBSFN sub-frames after the position, wherein a number of the other MBSFN sub-frames is a difference value between a number of all MBSFN sub-frames included in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value.

Preferably, as shown in FIG. 12, the determination module 10 may include: a third allocation unit 110, configured to allocate the MBSFN sub-frame resources for the MBMSs to each MCH in the MSP; and a second processing unit 112, configured to, and under the condition that a number of MBSFN sub-frames allocated to a part of MCHs in the MSP is determined to exceed a preset threshold value, start recounting of other MBSFN sub-frames after a corresponding position where the number of the MBSFN sub-frames allocated to the part of MCHs reaches the preset threshold value according to an agreement premade with the UE, wherein a number of the other MBSFN sub-frames is a difference value between a number of all MBSFN sub-frames included in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

Preferably, as shown in FIG. 12, the determination module 10 may include: a configuration unit 114, configured to configure a limiting condition, wherein the limiting condition is that a number of MBSFN sub-frames allocated to each MCH for the MBMSs in the MSP does not exceed a preset threshold value; and a fourth allocation unit 116, configured to allocate the MBSFN sub-frame resources for the MBMSs to each MCH in the MSP according to the limiting condition.

Preferably, as shown in FIG. 12, the determination module 10 may include: a regulation unit 118, configured to regulate a length of a stop MTCH field in the MSI, wherein the length of the stop MTCH field is increased by N bits, wherein N is a positive integer.

Preferably, the preset threshold value is 2,043 MBSFN sub-frames.

Figure 13:
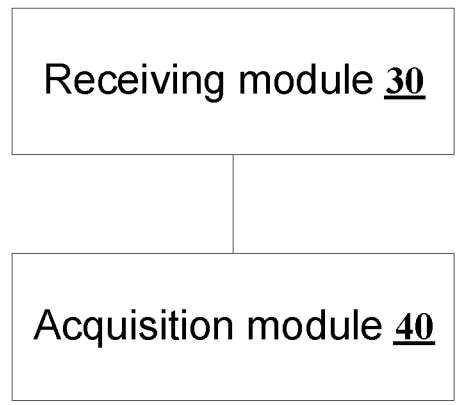
FIG. 13 is a structure block diagram of a device for processing sub-frame resource according to an embodiment of the present disclosure.

FIG. 13 is a structure block diagram of a device for processing sub-frame resource according to an embodiment of the present disclosure. As shown in FIG. 13, the device for processing sub-frame resource may include: a receiving module 30, configured to receive an allocation manner notice from network-side equipment, wherein the allocation manner notice is configured to indicate that the network-side equipment determines an allocation manner for allocating MBSFN sub-frame resources to each MCH and an MBMS in the MCH under the condition that an MSP exceeds a CSP; and an acquisition module 40, configured to acquire a required MBMS according to the allocation manner notice.

Figure 14:
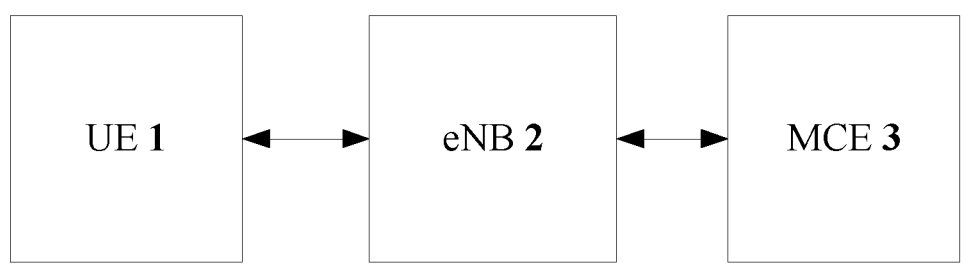
FIG. 14 is a structure diagram of an MBMS scheduling system according to a preferred embodiment of the present disclosure.

As a preferred embodiment of the present disclosure, in order to implement the abovementioned MBMS scheduling method, an MBMS scheduling system is also provided. FIG. 14 is a structure diagram of an MBMS scheduling system according to a preferred embodiment of the present disclosure. As shown in FIG. 14, the system may include: UE 1, an eNB 2 and an MCE 3. The UE 1 is configured to receive an MCCH message and MSI, and determine positions of MBMSFN sub-frames where an interested MBMS is located according to the MCCH message and the MSI. The eNB 2 is configured to allocate MBSFN sub-frames to MBMSs of MCHs in an MSP, and send the MSI to indicate a sub-frame allocation result. The MCE 3 is configured to allocate MBSFN sub-frames and a CSP/MSP to an MBSFN area, and is further configured to limit that a number of the MBSFN sub-frame allocated in an MSP does not exceed a specific value (for example: 2,043).

From the above, it can be seen that the embodiment has the following technical effects (it is important to note that these effects are effects which may be achieved by certain preferred embodiments): according to the technical solutions provided by the embodiment of the present disclosure, when the MSP exceeds the CSP, the eNB may allocate the resources to the MBMSs in each CSP and indicate resource allocation in each CSP in the MSI; or the eNB allocates the resources to the MBMSs in the MSP, and if more than 2,043 MBSFN sub-frame resources for the MBMSs have been allocated to the MCHs in the MSP, the UE is notified through the indication information in the MSI, or it is limited that the number of the MBSFN sub-frames allocated to each MCH for the MBMSs in the MSP does not exceed 2,043, so that MBMS resource scheduling under the condition that the MSP exceeds the CSP may be implemented, the UE may be ensured to correctly receive the required MBMS, and user experiences may be improved.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, the methods and devices for allocating and processing sub-frame resource provided by the embodiment of the present disclosure have the following beneficial effects: under the condition that the MSP exceeds the CSP, the MBMS resource scheduling is implemented, the UE may be ensured to correctly receive the required MBMS, and user experiences may be improved.

What is claimed is:

1. A method for allocating sub-frame resource, comprising:

under the condition that a Multicast Channel (MCH) Scheduling Period (MSP) exceeds a Common Sub-frame allocation Period (CSP), determining an allocation manner for allocating Multicast Broadcast over Single Frequency Network (MBSFN) sub-frame resources to each MCH and a Multimedia Broadcast Multicast Service (MBMS) in the MCH; and notifying User Equipment (UE) of the allocation manner;

wherein determining the allocation manner for allocating the MBSFN sub-frame resources to each MCH and the MBMS in the MCH comprises:

allocating the MBSFN sub-frame resources for the MBMSs to each MCH in the MSP; and when a number of MBSFN sub-frames allocated to a part of MCHs in the MSP exceeds a preset threshold value, adding indication information to a corresponding position where the number of the MBSFN sub-frames allocated to the part of MCHs reaches the preset threshold value, and starting recounting of other MBSFN sub-frames after the position, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value; or allocating the MBSFN sub-frame resources for the MBMSs to each MCH in the MSP; and when a number of MBSFN sub-frames allocated to a part of MCHs in the MSP exceeds a preset threshold value, starting recounting of other MBSFN sub-frames after a corresponding position where the number of the MBSFN sub-frames allocated to the part of MCHs reaches the preset threshold value according to an agreement pre-made with the UE, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

2. The method according to claim 1, wherein determining the allocation manner for allocating the MBSFN sub-frame resources to each MCH and the MBMS in the MCH comprises:
   determining that the MSP comprises multiple CSPs;
   allocating the MBSFN sub-frame resources for the MBMSs to each MCH in each CSP; and
   indicating the MBSFN sub-frames allocated to each MBMS in each CSP in MCH Scheduling Information (MSI) respectively.

3. The method according to claim 1, wherein determining the allocation manner for allocating the MBSFN sub-frame resources to each MCH and the MBMS in the MCH comprises:
   regulating a length of a stop Multicast Traffic Channel (MTCH) field in the MSI, wherein the length of the stop MTCH field is increased by N bits, wherein N is a positive integer.

4. The method according to claim 1, wherein determining the allocation manner for allocating the MBSFN sub-frame resources to each MCH and the MBMS in the MCH comprises:
   configuring a limiting condition, wherein the limiting condition is that a number of MBSFN sub-frames allocated to each MCH for the MBMSs in the MSP does not exceed a preset threshold value; and
   allocating the MBSFN sub-frame resources for the MBMSs to each MCH in the MSP according to the limiting condition.

5. The method according to claim 1, wherein the preset threshold value is 2,043 MBSFN sub-frames.

6. A method for processing sub-frame resource, comprising:
   receiving an allocation manner notice from network-side equipment, wherein the allocation manner notice indicates that the network-side equipment determines an allocation manner for allocating Multicast Broadcast over Single Frequency Network (MBSFN) sub-frame resources to each Multicast Channel (MCH) and a Multimedia Broadcast Multicast Service (MBMS) in the MCH under the condition that an MCH Scheduling Period (MSP) exceeds a Common Sub-frame allocation Period (CSP); and
   acquiring a required MBMS according to the allocation manner notice;
   wherein determining the allocation manner for allocating the MBSFN sub-frame resources to each MCH and the MBMS in the MCH comprises:
   allocating the MBSFN sub-frame resources for the MBMSs to each MCH in the MSP; and when a number of MBSFN sub-frames allocated to a part of MCHs in the MSP exceeds a preset threshold value, adding indication information to a corresponding position where the number of the MBSFN sub-frames allocated to the part of MCHs reaches the preset threshold value, and starting recounting of other MBSFN sub-frames after the position, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value; or
   allocating the MBSFN sub-frame resources for the MBMSs to each MCH in the MSP; and when a number of MBSFN sub-frames allocated to a part of MCHs in the MSP exceeds a preset threshold value, starting recounting of other MBSFN sub-frames after a corresponding position where the number of the MBSFN sub-frames allocated to the part of MCHs reaches the preset threshold value according to an agreement premade with the UE, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

7. A device for allocating sub-frame resource, comprising
   a determination module, configured to, under the condition that a Multicast Channel (MCH) Scheduling Period (MSP) exceeds a Common Sub-frame allocation Period (CSP), determine an allocation manner for allocating Multicast Broadcast over Single Frequency Network (MBSFN) sub-frame resources to each MCH and a Multimedia Broadcast Multicast Service (MBMS) in the MCH; and
   a notification module, configured to notify User Equipment (UE) of the allocation manner;
   wherein the determination module comprises:
   a second allocation unit, configured to allocate the MBSFN sub-frame resources for the MBMSs to each MCH in the MSP; and
   a first processing unit, configured to, when a number of MBSFN sub-frames allocated to a part of MCHs in the MSP exceeds a preset threshold value, add indication information to a corresponding position where the number of the MBSFN sub-frames allocated to the part of MCHs reaches the preset threshold value, and start recounting of other MBSFN sub-frames after the position, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value;

or the determination module comprises:

a third allocation unit, configured to allocate the MBSFN sub-frame resources for the MBMSs to each MCH in the MSP; and a second processing unit, configured to, when a number of MBSFN sub-frames allocated to a part of MCHs in the MSP exceeds a preset threshold value, start recounting of other MBSFN sub-frames after a corresponding position where the number of the MBSFN sub-frames allocated to the part of MCHs reaches the preset threshold value according to an agreement premade with the UE, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

8. The device according to claim 7, wherein the determination module comprises:

a determination unit, configured to determine that the MSP comprises multiple CSPs;

a first allocation unit, configured to allocate the MBSFN sub-frame resources for the MBMSs to each MCH in each CSP; and an indication unit, configured to indicate the MBSFN sub-frames allocated to each MBMS in each CSP in MCH Scheduling Information (MSI) respectively.

9. The device according to claim 7, wherein the determination module comprises:

a regulation unit, configured to regulate a length of a stop Multicast Traffic Channel (MTCH) field in the MSI, wherein the length of the stop MTCH field is increased by N bits, wherein N is a positive integer.

10. A device for processing sub-frame resource, comprising:

a receiving module, configured to receive an allocation manner notice from network-side equipment, wherein the allocation manner notice indicates that the network-side equipment determines an allocation manner for allocating Multicast Broadcast over Single Frequency Network (MBSFN) sub-frame resources to each Multicast Channel (MCH) and a Multimedia Broadcast Multicast Service (MBMS) in the MCH under the condition that an MCH Scheduling Period (MSP) exceeds a Common Sub-frame allocation Period (CSP); and an acquisition module, configured to acquire a required MBMS according to the allocation manner notice;

wherein determining the allocation manner for allocating the MBSFN sub-frame resources to each MCH and the MBMS in the MCH comprises:

allocating the MBSFN sub-frame resources for the MBMSs to each MCH in the MSP; and when a number of MBSFN sub-frames allocated to a part of MCHs in the MSP exceeds a preset threshold value, adding indication information to a corresponding position where the number of the MBSFN sub-frames allocated to the part of MCHs reaches the preset threshold value, and starting recounting of other MBSFN sub-frames after the position, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, indication information is added to corresponding positions where the preset threshold value is reached every time and the other MBSFN sub-frames after the positions are recounted until the number of the other MBSFN sub-frames is lower than the preset threshold value; or allocating the MBSFN sub-frame resources for the MBMSs to each MCH in the MSP; and when a number of MBSFN sub-frames allocated to a part of MCHs in the MSP exceeds a preset threshold value, starting recounting of other MBSFN sub-frames after a corresponding position where the number of the MBSFN sub-frames allocated to the part of MCHs reaches the preset threshold value according to an agreement premade with the UE, wherein a number of the other MBSFN sub-frames is a difference value between a number of all MBSFN sub-frames comprised in the MBSFN sub-frame resources and the preset threshold value, and if the number of the other MBSFN sub-frames still exceeds the preset threshold value, the other MBSFN sub-frames after corresponding positions where the preset threshold value is reached every time are recounted until the number of the other MBSFN sub-frames is lower than the preset threshold value, and when a number of MBSFN sub-frames allocated to a single MBMS exceeds the preset threshold value, other MBSFN sub-frames after corresponding positions where the preset threshold value is reached every time are recounted.

* * * * *